(12) United States Patent
Carpenter et al.

(10) Patent No.: US 7,089,393 B2
(45) Date of Patent: Aug. 8, 2006

(54) DATA PROCESSING USING A COPROCESSOR

(75) Inventors: Paul Matthew Carpenter, Cambridge (GB); Peter James Aldworth, Cambridge (GB)

(73) Assignee: ARM Limited, Cambridge (GB)

( * ) Notice: Subject to any disclaimer, the term of this patent is extended or adjusted under 35 U.S.C. 154(b) by 544 days.

(21) Appl. No.: 10/042,354

(22) Filed: Jan. 11, 2002

(65) Prior Publication Data

US 2002/0116580 A1    Aug. 22, 2002

(30) Foreign Application Priority Data

Feb. 20, 2001   (GB)  ................................. 0104160.7

(51) Int. Cl.
*G06F 12/04* (2006.01)
(52) U.S. Cl. ........................ 711/201; 711/125; 712/204; 712/210
(58) Field of Classification Search ................ 711/125, 711/201; 712/204, 210
See application file for complete search history.

(56) References Cited

U.S. PATENT DOCUMENTS

| | | | |
|---|---|---|---|
| 4,314,168 A * | 2/1982 | Breitenbach ................. | 310/13 |
| 4,860,197 A * | 8/1989 | Langendorf et al. ......... | 712/238 |
| 5,025,407 A * | 6/1991 | Gulley et al. ............... | 708/514 |
| 5,168,561 A | 12/1992 | Vo | |
| 5,577,200 A * | 11/1996 | Abramson et al. ........... | 714/50 |
| 5,668,984 A * | 9/1997 | Taborn et al. .............. | 712/222 |
| 6,002,881 A * | 12/1999 | York et al. .................. | 712/34 |
| 6,331,856 B1 | 12/2001 | Van Hook et al. | |
| 6,418,166 B1 * | 7/2002 | Wu et al. .............. | 375/240.12 |
| 6,507,293 B1 * | 1/2003 | Deeley et al. ................ | 341/67 |

FOREIGN PATENT DOCUMENTS

| EP | 0377990 | * | 7/1990 |
|---|---|---|---|
| EP | 1 130 868 A2 | | 9/2001 |

OTHER PUBLICATIONS

User's Guide for TMS32010 co-processor made by Texas Instrument (Aug. 31, 1992) p. 3-7.*
S. Furber, "VLSI RISC Architecture and Organization" 1989, pp. 39-41 and 258-269.
P. Pirsch et al, "VLSI Architectures for Video Compression—A Survey" *Proceedings of the IEEE*, vol. 83, No. 2, Feb. 1995, pp. 220-246.
PCT International Search Report dated Apr. 2, 2002.

* cited by examiner

*Primary Examiner*—Matthew Kim
*Assistant Examiner*—Hetul Patel
(74) *Attorney, Agent, or Firm*—Nixon & Vanderhye P.C.

(57) ABSTRACT

A data processing system using a main processor 8 and a coprocessor 10 provides coprocessor load instructions (US-ALD) for loading a variable number of data values dependent upon alignment into the coprocessor 10 and also specifying data processing operations to be performed upon operands within those loaded data words to generate result data words. The specified coprocessor processing operations may be a sum of absolute differences calculation for a row of pixel byte values. The result of this may be accumulated within an accumulate register 22. A coprocessor memory 18 is provided within the coprocessor 10 to provide local storage of frequently used operand values for the coprocessor 10.

11 Claims, 4 Drawing Sheets

USALD [Rn], {COND}
USALD [Rn,#+/-10_BIT_OFFSET]{!}, {COND}
USALD [Rn], #+/-10_BIT_OFFSET, {COND}

DATA PROCESSING USING A COPROCESSOR

BACKGROUND OF THE INVENTION

1. Field of the Invention

This invention relates to data processing systems. More particularly, this invention relates to data processing systems incorporating both a main processor and a coprocessor.

2. Description of the Prior Art

It is known to provide data processing systems incorporating both a main processor and a coprocessor. Examples of such data processing systems are those of ARM Limited, Cambridge, England, which provides main processors such as the ARM7 or ARM9 that may be combined with a coprocessor, such as the Piccolo coprocessor, for performing functions such as specialised digital signal processing operations. Further examples of coprocessors may be floating point arithmetic coprocessors and the like.

Coprocessors are often used to provide additional functionality within a data processing system that is not required in the basic system, but may be useful in certain circumstances when the additional overhead of providing a suitable coprocessor is justified. Particularly demanding data processing environment are those that involve digital signal processing, such as video image manipulation. The volumes of data that require processing in such applications can be high. This presents a challenge to provide data processing systems able to cope with the volume of processing necessary whilst simultaneously having a relatively low cost and low power consumption.

One approach to dealing with such computationally intensive applications is to provide special purpose digital signal processing circuitry. Such special purpose circuitry can have an architecture specifically adapted to perform a relatively restricted range of processing operations, but at a relatively high speed. As an example, multiple data channels may be provided to stream data into and out of the relevant circuit portions in parallel. Whilst such an arrangement may be able to cope with the high data processing volumes required, it generally has the disadvantage of being inflexible. This inflexibility may mean that a relatively minor change in the algorithm it is desired to execute could require expensive corresponding hardware changes. This contrasts with a general purpose processor which is generally designed from the outset to be able to execute an enormous variety of different algorithms.

SUMMARY OF THE INVENTION

Viewed from one aspect, the present invention provides data processing apparatus comprising:

(i) a main processor responsive to program instructions to perform data processing operations; and (ii) a coprocessor coupled to said main processor and responsive to a coprocessor load instruction on said main processor to load one or more loaded data words into said coprocessor and perform at least one coprocessor processing operation specified by said coprocessor load instruction using said one or more loaded data words to provide operand data to generate at least one result data word;

(iii) wherein in response to said coprocessor load instruction a variable number of loaded data words are loaded into said coprocessor in dependence upon whether a start address of said operand data within said one or more loaded data words is aligned with a word boundary.

The invention recognises that within a system containing a general purpose main processor, a coprocessor may be provided with very specific functions in mind. In particular, considerable advantages in terms of speed and code density may be achieved by providing that the coprocessor load instructions also trigger data processing operations to be performed upon operands within the loaded data words to generate result data words. Whilst such a coprocessor has a highly specific role within the system, it has been found that in combination with a general purpose main processor, such a combination is able to provide an advantageous increase in the processing throughput whilst maintaining the ability of a general purpose processor to accommodate different algorithms and circumstances.

Whilst memory systems and bus structures are often conveniently provided to operate only at certain alignments with the address base of the system, the desired operand values that are to be manipulated and used by the coprocessor may have a different alignment. Thus, in order to provide improved performance the number of loaded data words that are loaded to the coprocessor is dependent upon the alignment. As an example, should it be desired to load eight 8-bit operands in response to a coprocessor load instruction using word-aligned 32-bit data words, then this may be achieved either with two data words if the operands are aligned to a word boundary, or three data words if the operands are not aligned to the word boundary.

Particularly preferred embodiments of the invention are ones in which a coprocessor memory is provided within the coprocessor to store locally data words to be used as operands in combination with the loaded data words. Such an arrangement recognises that in many real life computational situations a relatively small subset of data words are frequently required for use in combination with a much wider set of data words that are less frequently required. This feature exploits this by locally storing the frequently required data words such that the required data channel capacity between the main processor and the coprocessor is advantageously reduced. In contrast to a conventional digital signal processing system, it is generally more difficult to simply add more data channels between a main processor and a coprocessor as required since the main processor architecture may be constrained by other factors.

The performance of the system is improved in embodiments in which loaded data words to be retrieved from a memory coupled to the main processor are passed to the coprocessor without being stored within registers of the main processor. In this situation, it will be seen that the main processor can provide the role of an address generator and memory access mechanism for the coprocessor.

It is particularly convenient when the main processor includes a register operable to store an address value pointing to the data words to be loaded into the coprocessor. This gives control of the address pointer to the main processor thereby yielding an improved degree of flexibility in the type of algorithm that may be supported.

It will be appreciated that the data words to be loaded and manipulated could have a variety of widths. As an example, the data words could be 32-bit data words containing four 8-bit operands each representing an 8-bit pixel value. However, it will be appreciated that the data words and operands could take a wide variety of different sizes, such as 16-bits, 64-bits, 128-bits, or the like.

In many real life situations whilst the alignment can vary, it is generally the same for a large number of sequential accesses. In this circumstance, preferred embodiments may use a register value within the coprocessor to store an alignment value specifying the alignment between the data operands and the data words and to which the coprocessor may be responsive to control how many data words are loaded for each coprocessor load instruction.

Whilst the coprocessor could perform a wide variety of processing operations upon the operands within the loaded data words depending upon the particular system, the invention is particularly useful in systems where it is desired to perform of sum of absolute differences between a plurality of operand values. Performing a sum of absolute differences for a large quantity of data often represents a significant portion of the processing load required by a general purpose processor in carrying out operations such as pixel block matching during image processing. Offloading the bulk of the low level calculation of the sum of absolute differences to a coprocessor allows a significant increase in performance to be achieved whilst retaining the flexibility of the general purpose processor to employ the special purpose sum of absolute differences calculations as part of a wide variety of different algorithms.

Within a sum of absolute differences system, an accumulate register may advantageously be provided within the coprocessor to accumulate the total sum of absolute differences calculated. This accumulate register within the coprocessor can be retrieved back into the main processor for further manipulation as required but held locally within the coprocessor to speed operation and reduce the requirements for data transfer between the coprocessor and the main processor.

In order to enhance the role of the main processor as an address generator for the coprocessor, the coprocessor load instructions may advantageously include an offset value to be applied to the address value stored as a pointer within the main processor. The offset value may optionally be used to update the pointer value either before or after the pointer value is used.

The invention also provides a computer program product incorporating the coprocessor load instructions as described above. The computer programme product may be in the form of a distributable medium, such as a compact disk or a floppy disk, or may be part of firmware embedded within a device or may be dynamically downloaded, such as via a network link.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
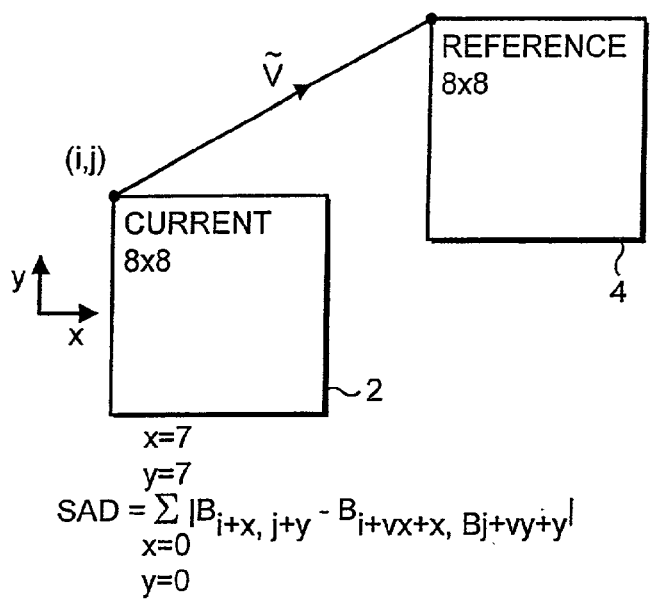
FIG. 1 schematically illustrates a desired sum of absolute differences calculation.

FIG. 1 shows a current block of pixels 2 for which it is desired to find the best match within a reference image. The current block of pixels comprises an 8*8 block of 8-bit pixel byte values. The current block of pixels 2 is compared with reference blocks of pixels 4 located at different vector displacements v from the current block of pixels 2. At each vector displacement it is desired to test for a match, the sum of absolute differences expression illustrated in FIG. 1 is calculated. This expression determines the absolute difference between respective corresponding pixel values for the two blocks and sums the 64 absolute difference values obtained. A good image match is generally indicated by a low sum of absolute differences value. Within an image data processing system, such as one performing MPEG type processing, such a sum of absolute differences calculation is often required and can represent a disadvantageously large processing overhead for a general purpose processor.

Figure 2:
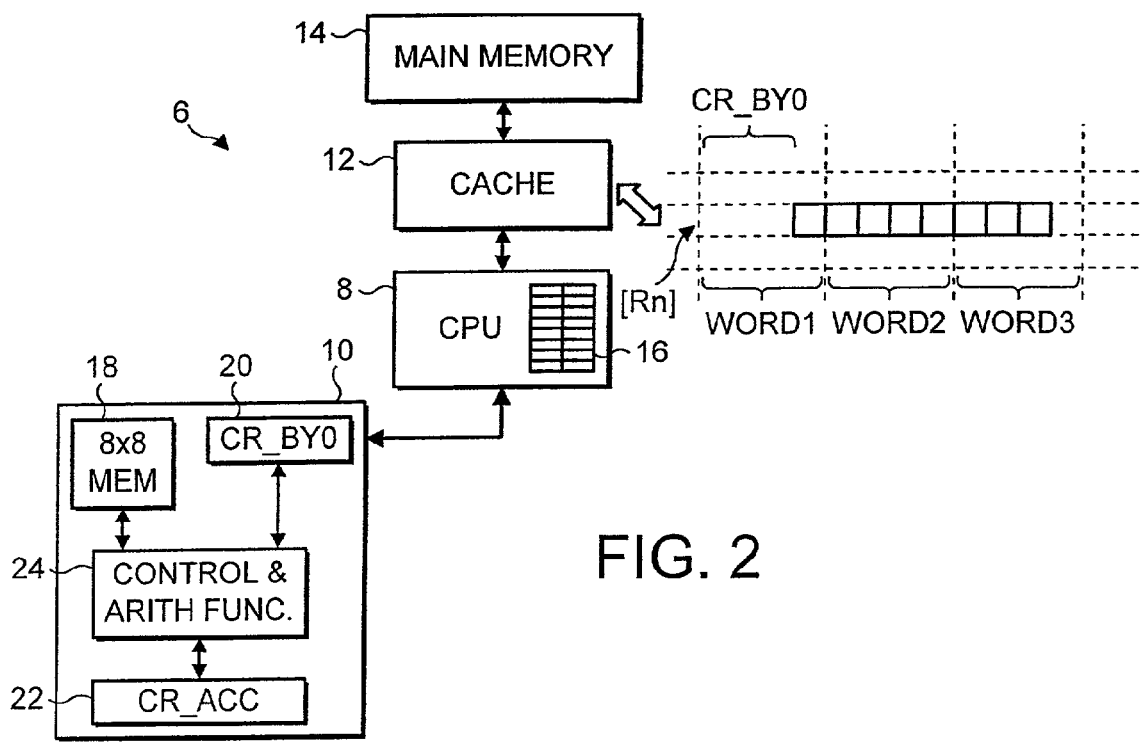
FIG. 2 schematically illustrates the combination of a main processor and a coprocessor.

FIG. 2 illustrates a data processing system 6 including a main processor 8, a coprocessor 10, a cache memory 12 and a main memory 14. The main processor 8 includes a register bank 16 storing general purpose register values that may be utilised by the main processor 8. The main processor 8 may be, for example, one of the main processors designed by ARM Limited, Cambridge, England.

The main processor 8 is coupled to the cache memory 12, which serves to provide high speed access to the most frequently required data values. A lower speed, but higher capacity, main memory 14 is provided outside of the cache 12.

The coprocessor 10 is coupled to a coprocessor bus of the main processor 8 and is responsive to coprocessor instructions received and executed by the main processor 8 to carry out predefined operations. Within the ARM architecture, there are provided load coprocessor instructions that serve to load a data value into a coprocessor. The coprocessor 10 shown in FIG. 2 extends the functionality of such coprocessor load instructions to also use them to specify to the coprocessor that it should carry out certain predefined processing operations upon operands values within the data words loaded into the coprocessor 10.

More particularly, the coprocessor 10 includes a coprocessor memory 18, an alignment register 20, an accumulate register 22 and a control and arithmetic function unit 24. Specific coprocessor load instructions may be used to load sixteen 32-bit data words into the coprocessor memory 18. These sixteen data words each contain four 8-bit pixel values and correspond to an 8*8 pixel block that is the current block 2 illustrated in FIG. 1. These pixel values within the current block 2 will be compared as a block using a sum of absolute differences with reference blocks of pixels 4 taken from a variety of different positions within a reference image to determine the reference block 4 that gives the lowest sum of absolute differences and so corresponds to a best image match. Storing the frequently used pixel values of the current block 2 locally within the coprocessor memory 18 is an efficient use of processing resources. Once the coprocessor memory 18 has been loaded with the current block 2, special coprocessor load instructions (USALD instructions) are executed by the main processor 8 that serve to load either two or three data words into the coprocessor 10 and calculate a sum of absolute differences value for eight pixel operands within those loaded data words. The USALD instruction within the instruction stream of the main processor 8 is also passed (either directly or in the form of one or more control signals) to the coprocessor 10 where it triggers the control and arithmetic function logic 24 to control the loading of the required number of data words from either the cache 12 or the main memory 14 via the main processor 8 and also then carry out the sum of absolute differences calculation using these loaded values and values from the coprocessor memory 18. The alignment register 20 holds an alignment value that is set up in advance by a coprocessor register load instruction carried out by the main processor 8. The control and arithmetic function logic 24 is responsive to this alignment value to either load two 32-bit data words when the operands are aligned with the word boundaries or three 32-bit data words when there is no such alignment. To the side of the cache memory 12 in FIG. 2 there is illustrated eight desired pixel operand values stored within the cache memory unaligned with the word boundaries and with an alignment offset of CR_BY0. In the example shown, three 32-bit data words would be loaded into the coprocessor 10 in response to an address value [Rn] stored within one of the registers of the register bank 16 and pointing to a word aligned addressed as illustrated. When three 32-bit data words are retrieved, the control and arithmetic function logic 24 performs a multiplexing operation to select out the required operands from within the loaded data words in dependence upon the specified alignment value. The operand values extracted from the loaded data words are subject to a sum of absolute differences calculation that forms part of the calculation illustrated in FIG. 1 using standard arithmetic processing logic, such as adders and subtractors. It will be appreciated that in the example illustrated the eight pixel byte operands effectively represent a single row within the block comparison between the current pixel block 2 and the reference pixel block 4 illustrated in FIG. 1. To perform the full calculation shown in FIG. 1, eight such coprocessor load instructions would require to be executed in turn. The sum of absolute differences calculated by each of these coprocessor instructions is accumulated within the accumulate register 22. Accordingly, after execution of all eight coprocessor load instructions that each specify a row sum of absolute differences, a block sum absolute of differences will have been performed and the result stored within the accumulate register 22. This stored value may then be returned to the main processor 8, such as by a main processor instructions to move a coprocessor register value back to one of the registers within the register bank 16.

In the example discussed above, the address pointer held within the register of the register bank 16 directly pointed to the start address of the first data word to be retrieved. However, it is also possible that this stored pointer value may be subject to an offset, such as a 10-bit offset, that is applied to the stored pointer value to indicate the actual address to be accessed. It is convenient in some circumstances that such an offset may be additionally used to update the pointer value upon each use. This effectively allows the coprocessor load instructions to step through the data specifying the reference image by the appropriate amounts to pick up the different 8-pixel rows required for a specific reference block 4 without necessarily requiring additional main processor instructions to modify the pointer.

Figure 3:
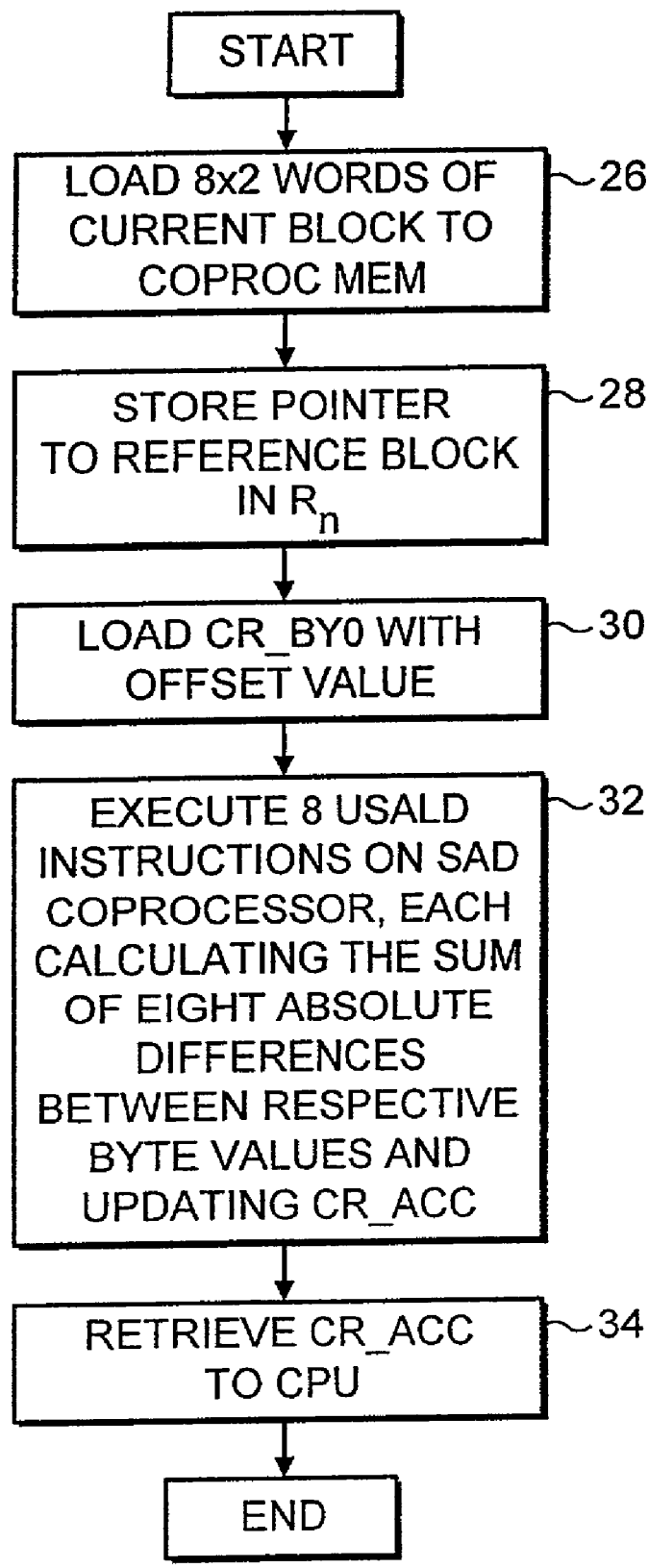
FIG. 3 is a flow diagram schematically illustrating an example of the type of operation that may be performed by the system of FIG. 2.

FIG. 3 is a flow diagram schematically illustrating one example of processing that may be performed using the system of FIG. 2. At step 26, sixteen words representing a current pixel block 2 are loaded from the cache 12, or the main memory 14, into the coprocessor memory 18. At step 28, the register Rn within the main processor 8 is loaded with a pointer value pointing to the start of the reference block 4 within the memory. At step 30, the alignment value within the alignment register 20 of the coprocessor 10 is loaded using a coprocessor register load instruction on the main processor 8. It will be appreciated that the steps 26, 28 and 30 provide the set up of the data processing environment in order to perform the coprocessor load and sum of absolute differences instructions. In many circumstances, this set up need only be performed once and then remain current for the testing of a large number of reference blocks 4 against a specific current block 2. In these circumstances, the processing overhead associated with steps 26, 28 and 30 is relatively reduced.

Step 32 represents the execution of eight USALD coprocessor load instructions as discussed previously. Each of these instructions respectively calculates a sum of absolute differences for a row within the current block 2 and the reference block 4 and updates the accumulate value within the accumulate register 22.

At step 34, the calculated sum of absolute differences value for the entire reference block 4 may be retrieved from the accumulate register 22 to the main processor 8 by a move coprocessor register to main processor register instruction. This accumulated value can then be compared with previously calculated accumulate values or other parameters to identify an image best match or for other purposes.

Figures 4, 5:
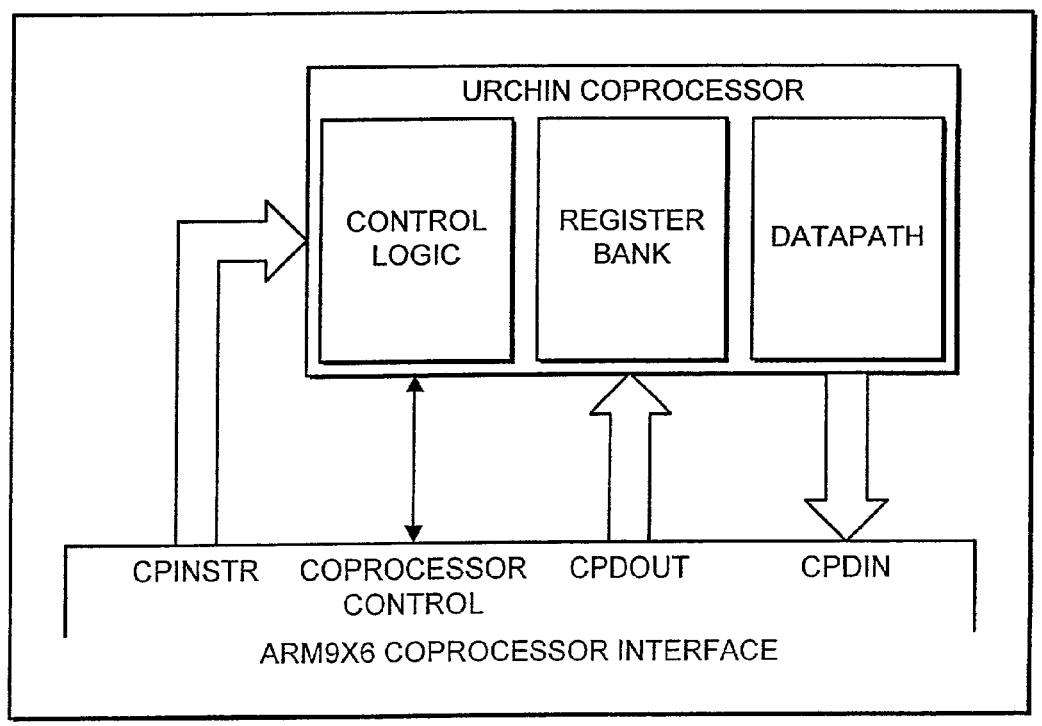
FIG. 4 illustrates four example coprocessor load instructions.
FIGS. 5 to 7 provide further details of a coprocessor in accordance one example embodiment.

FIG. 4 shows three variants of the USALD instruction. The first variant does not use an offset but merely specifies the address via a pointer held within register Rn and is subject to conditional execution in dependence upon conditional codes {cond}. The second variant uses an address pointer that is subject to a 10-bit offset value that may be either added or subtracted from the initial value either before or after that value is used in dependence upon the flag {!}. The third variant again uses an offset value that is applied to the pointer value within the register Rn before its use, the pointer value not being altered.

A further, more specific description of an example embodiment of the invention may be found in the following:

1.1 Terms and abbreviations

This document uses the following terms and abbreviations.

| Term | Meaning |
|------|---------|
| ASIC | Application Specific Integrated Circuit |
| BIST | Built In Self Test |
| JTAG | Joint Test Action Group |

Scope

The document captures the engineering details for an ARM9X6 coprocessor to enhance performance of MPEG4 encoder applications. It covers the functional specification from both a hardware and a software point of view. It does not include the implementation details of either the hardware or the software.

Introduction

The Urchin CoProcessor (UCP) is an ARM9X6 coprocessor designed to accelerate the execution of Sum of Absolute Differences (SAD) operations. The SAD operation is used in MPEG4 motion estimation algorithms when comparing an 8x8 block from the reference frame with an 8x8 block in the current frame. This is part of the MPEG4 video encoding application.

1.2 UCP Structure

UCP interprets a set of coprocessor instructions that are part of the ARM instruction set. ARM's coprocessor instructions allow the ARM processor to:

- Transfer data between UCP and memory (using Load Coprocessor, LDC, and Store Coprocessor, STC, instructions).
    - Transfer data between UCP and ARM registers (using Move to Coprocessor, MCR, and Move to ARM, MRC, instructions).

ARM acts as an address generator and data pump for UCP.

UCP consists of: a register bank, a datapath and control logic. This is shown in Figure 5 UCP Overview.

P010796US 12

1.3 Coprocessor Interface

*The only connection to the UCP is the coprocessor interface from the ARM. All other system connectivity (such as AMBA or interrupts) are handled via the ARM.*

1.4 Design Constraints

The UCPs initial implementation is a point solution targeted at a 0.18um library. This will integrate the UCP with an ARM926. The UCP will be the only coprocessor in the system. The primary constraint on the design are the tight timescale requirements so all design decisions are based on this.

Other important design constraints are; gate count, maximum operating frequency (worst case) and power consumption.

1.4.1 Gate count

This section has been removed because it is irrelevant to the patent application.

1.4.2 Operating frequency

This section has been removed because it is irrelevant to the patent application.

1.4.3 Power consumption

This section has been removed because it is irrelevant to the patent application.

Programmer's Model

1.5 Registers

The UCP coprocessor contains two types of data storage:

- Registers: These are used to transfer data directly between ARM registers and the coprocessor. These can be accessed by MCR and MRC operations.
- Block Buffer: This a 8 byte (64-bit) by 8 line store which can only be loaded or stored directly from memory mapped areas (i.e not ARM registers). The Block Buffer is accessed by a set of special UCP instructions (ARM sees these as LDC and STC operations).

The following is a summary of Registers in the UCP:

| Register Name | Reset value | Register Number | Description |
| --- | --- | --- | --- |
| CR_ACC | 0 | 7 | stores accumulated results from SAD operations. |
| CR_IDX | 0 | 4 | stores the line index for the block buffer. |
| CR_BYO | 0 | 2 | stores the byte offset used to load a block from the reference frame. |
| CR_CFG | 0 | 1 | stores the UCP configuration. |

P010796US 13

| | | | |
|---|---|---|---|
| CR_ID | * | 0 | the UCP ID register (* reset value = ID value) |

Reserved or undefined register bits should be masked on register reads and set to zero for register writes. The exceptions to this are CR_ACC and CR_BYO. These registers will always return zero on reads from unused bits and writes to these registers can put any value into unused bit positions (the UCP will ignore these values).

1.5.1 CR_ACC

This is a 14 bit read/write register. It can be updated directly by MCRs and also indirectly by SAD operations.

1.5.2 CR_IDX

This is a three bit read/write register. It can be updated directly by MCRs and indirectly by Block Buffer loads/stores or SAD operations which increment the line index.

This register indicates the line index for the Block Buffer. This sets which line will be referenced by the next operation which accesses the Block Buffer (these operations only ever use a single line from the Block Buffer).

When this register is incremented past the value 7 it will wrap to zero.

1.5.3 CR_BYO

This is a two bit read/write register. It can only be updated by MCRs.

The UCP supports accesses to the reference frame from byte aligned addresses. The lower two bits of the address bus for these loads are stored in this register.

NOTE that the coprocessor has no direct visibility of the address value used by the ARM for memory accesses, this is why software must program the byte offset into CR_BYO separately. Also the ARM does not directly support non word aligned loads for coprocessor so the UCP has to perform three word loads and then extract the 8-bytes it needs.

1.5.4 CR_CFG

This is a single bit read/write register. It can only be updated by MCRs.

The IDX_INC bit controls whether the CR_IDX register is incremented or not after a by Block Buffer load/store or SAD operation. When it is clear no increment occurs. When it is set CR_IDX is incremented after the Block Buffer or SAD operation completes.

1.5.5 CR_ID

This 14-bit read only register contains the UCP architecture and revision code.

| 31 | 14 13 | 8 7 | 4 3 | 0 |
|---|---|---|---|---|
| Reserved | Architecture | 0xF | revision | |

Bits[3:0]    contain the revision number for the implementation.
Bits[7:4]    is set to the value 0xF for ARM designed implementations.
Bits[13:8]    contain the UCP architecture version:
             0x00 = Version 1

P010796US

1.6 Instruction Set

The UCP coprocessor's assembler syntax uses the same format as ARM's.

{ }  indicates an optional field.

cond field.                      is the ARM instruction condition code dest    specifies the UCP destination register Rn      is an ARM register.

CRn     is a UCP register.

!                               indicates that the calculated address should be written back to the base register.

UCP                             UCP's coprocessor number.

10_Bit_Offset  is an expression evaluating to an 10-bit word offset. This offset is added to the base register to form the load address. Note that the offset must be a multiple of 4.

6_Bit_Offset   is an expression evaluating to an 6-bit word offset. This offset is added to the base register to form the load address. Note that the offset must be a multiple of 4.

*Note: Post indexing with or without write-back is allowed.*

The pages following describe UCP's instruction set.

1.6.1 Instruction set summary

| UCP instruction | Description |
| --- | --- |
| UMCR | Move to a UCP register from an ARM register |
| UMRC | Move to an ARM register from a UCP register |
| UBBLD | Load two words from memory into the Block Buffer |
| UBBST | Store two words from the Block Buffer to memory |
| USALD | Do byte aligned load of 8-bytes from memory, perform SAD and accumulate in CR_ACC |

1.6.2 Instruction encodings

UCP's instructions are in the following coprocessor instruction classes:

| UCP instruction | ARM Coprocessor encoding |
| --- | --- |
| UMCR | MCR |
| UMRC | MRC |
| UBBLD | LDC (multiple load) |
| UBBST | STC (multiple load) |
| USALD | LDC (multiple load) |

The coprocessor instructions are encoded as followed:

| | 31 30 29 28 | 27 | 26 | 25 | 24 | 23 | 22 | 21 | 20 | 19 18 17 16 | 15 14 13 12 | 11 10 9 8 | 7 6 5 4 3 2 1 0 |
| --- | --- | --- | --- | --- | --- | --- | --- | --- | --- | --- | --- | --- | --- |
| UMCR | cond | 1 | 1 | 1 | 0 | 0 | 0 | 0 | 0 | CRd | Rn | UCP | 0 0 0 1 0 0 0 0 |
| UMRC | cond | 1 | 1 | 1 | 0 | 0 | 0 | 0 | 1 | CRn | Rd | UCP | 0 0 0 1 0 0 0 0 |
| UBBLD | cond | 1 | 1 | 0 | P | U | 1 | W | 1 | Rn | 1 0 0 0 | UCP | 8_bit_offset |
| UBBST | cond | 1 | 1 | 0 | P | U | 1 | W | 0 | Rn | 1 0 0 0 | UCP | 8_bit_offset |
| USALD | cond | 1 | 1 | 0 | P | U | 1 | W | 1 | Rn | 1 0 0 1 | UCP | 8_bit_offset | cond : condition code

UCP: UCP coprocessor number.

Rn : ARM Register source

CRn : UCP Register source

Rd : ARM Register destination

CRd : UCP Register destination

8_bit_offset : An 8 bit number (0-255); used to indicate an address offset.

P010796US

P :  Pre/Post indexing bit 0 = post; add offset after transfer 1 = pre; add offset before transfer

U :  Up/Down bit 0 = down; subtract from base 1 = up; add offset to base

W :  Write-back bit 0 = no write-back 1 = write address into base

5   NOTE that only the above opcodes are valid for the UCP. Any variations on these opcodes (which retain UCP in bits 11 down to 8) will result in UNPREDICTABLE BEHAVIOUR.

1.6.3 UMCR

The UMCR instruction is used to write to the UCPs registers. UMCR moves data from an ARM register Rn to a UCP register CRd.

| 31 | 28 27 26 25 24 | 23 22 21 20 | 19 18 17 16 | 15  12 | 11  8 | 7 5 | 4 3 | 0 |
|---|---|---|---|---|---|---|---|---|
| cond | 1 1 1 0 | 0 0 0 0 | CRd | Rn | UCP | 0 0 0 1 | 0 0 | 00 |

Action
1 Move ARM register Rn to a UCP register CRd.

Mnemonics
    UMCR CRd, Rn, {cond}

Examples
    UMCR CR_ACC, R0    ;load contents of R0 into CR_ACC

1.6.4 UMRC

The UMRC instruction is used to read from the UCPs registers. UMCR moves data from a UCP register CRn to an ARM register Rd.

| 31 | 28 27 26 25 24 | 23 22 21 20 | 19 18 17 16 | 15  12 | 11  8 | 7 5 | 4 3 | 0 |
|---|---|---|---|---|---|---|---|---|
| cond | 1 1 1 0 | 0 0 0 1 | CRn | Rd | UCP | 0 0 0 1 | 0 0 | 00 |

Action
1 Move a UCP register CRn to an ARM register Rd.

Mnemonics
    UMRC Rd, CRn, {cond}

Examples
    UMRC R6, CR_ID    ;load ID register into R6.

1.6.5 UBBLD

The UBBLD instruction is used to load data into the Block Buffer.

| 31 30 29 28 | 27 26 25 24 | 23 22 21 20 | 19 18 17 16 | 15 14 13 12 | 11 10 9 8 | 7 6 5 4 3 2 1 0 |
|---|---|---|---|---|---|---|
| Cond | 1 1 0 P | U 1 W 1 | Rn | 1 0 0 0 | UCP | 8_bit_offset |

Action
1. Loadword Block_Buffer(CR_IDX,0)
2. Loadword Block_Buffer(CR_IDX,1)
3. If (IDX_INC==1)
4. ++CR_IDX

Mnemonics

UBBLD    [Rn], #0, {cond}

UBBLD    [Rn, #+/-10_Bit_Offset]{!}, {cond}

UBBLD    [Rn], #+/-10_Bit_Offset{!}, {cond}

Examples

UBBLD    [R0], #32O!    ;Load two words into Block Buffer from mem(R0) and post increment R0 to next line.

1.6.6 UBBST

The UBBST instruction is used to store data from the Block Buffer. This operation is intended for verification purposes only and should not be used by application code.

| 31 30 29 28 | 27 26 25 24 | 23 22 21 20 | 19 18 17 16 | 15 14 13 12 | 11 10 9 8 | 7 6 5 4 3 2 1 0 |
|---|---|---|---|---|---|---|
| Cond | 1 1 0 P | U 1 W 0 | Rn | 1 0 0 0 | UCP | 8_bit_offset |

Action
1. Storeword Block_Buffer(CR_IDX,0)
2. Storeword Block_Buffer(CR_IDX,1)
3. If (IDX_INC==1)
4. ++CR_IDX

Mnemonics

UBBST    [Rn], #0, {cond}

UBBST    [Rn, #+/-10_Bit_Offset]{!}, {cond}

UBBST    [Rn], #+/-10_Bit_Offset{!}, {cond}

Examples

UBBST    [R3], #8!    ;Store two words from the Block Buffer into memory starting from mem(r3)

P010796US 19

*NOTE*: *UCP does not support back to back UBBSTs when IDX_INC == 1. Each UBBST should be separated by at least a single NOP. Use of UBBST back to back will result in* *UNPREDICTABLE BEHAVIOUR*.

1.6.7 USALD

The USALD instruction loads data from the reference block and performs a SAD accumulate operation

| 31 30 29 28 | 27 26 25 24 | 23 22 21 20 | 19 18 17 16 | 15 14 13 12 | 11 10 9 8 | 7 6 5 4 3 2 1 0 |
|---|---|---|---|---|---|---|
| Cond | 1 1 0 P | U 1 W 1 | Rn | 1 0 0 1 | UCP | 8_bit_offset |

Action
1  If (CR_BYO==0)
2      Loadword to firstword_tmp
3  else
4      Loadword to mux1_tmp; Loadword to mux2_tmp; Based on CR_BYO combine mux1_tmp and mux2_tmp to form non aligned word load in firstword_tmp.
5  For each byte in firstword_tmp and each corresponding byte in Block_Buffer(CR_IDX, 0) perform SAD. Accumulate results in CR_ACC.
6  If (CR_BYO==0)
7      Loadword to secondword_tmp
8  else
9      Loadword to mux3_tmp; Based on CR_BYO combine mux2_tmp and mux3_tmp to form non aligned word load in secondword_tmp.
10 For each byte in secondword_tmp and each corresponding byte in Block_Buffer(CR_IDX, 1) perform SAD. Accumulate results in CR_ACC.
11 If (IDX_INC==1)
12     ++CR_IDX NOTE: Arithmetic is unsigned. No facilities are included to detect/handle overflow of CR_ACC. The size of CR_ACC has been chosen to ensure that overflow can not occur from an 8x8 block compare.

Mnemonics

USALD       [Rn], #0, {cond}

USALD       [Rn, #+/-10_Bit_Offset]{!}, {cond}

USALD       [Rn], #+/-10_Bit_Offset{!}, {cond}

Examples

USALD [R0], #320!      ;Process two words from mem(R0), perform SAD and post increment R0 to next line.

1.7 Instruction cycle timing

The table below describes the number of cycles each instruction takes to complete.

| Instruction | Cycle time |
|---|---|
| UMCR | 1 |

| | |
|---|---|
| UMRC | 1 |
| UBBLD | 2 |
| UBBST | 2 |
| USALD | N cycles |

*NOTE:* *N = 2 cycles if CR_BYO is zero, otherwise N = 3 cycles.*

1.8 Data Hazards

Data hazards are circumstances where data dependencies between instructions can result in unpredictable behaviour.

5  There are no hardware interlocks in UCP to cope with data hazards. Instead the software must include a non-coprocessor instruction, if need be a NOP, where necessary.

| Instruction | Next Instruction | |
|---|---|---|
| UMCR | 1) | No UMRC which uses CRd for 2 cycles |
| | 2) cycles | If CRd is CR_IDX then no UBBST for 2 |
| UMRC | Any | |
| UBBLD (when INC_IDX is clear) | No UBBST for 1 cycle | |
| UBBLD (when INC_IDX is set) | 1) | No UBBST for 2 cycles |
| | 2) | No UMRC CR_IDX for 2 cycles |
| UBBST (when INC_IDX is clear) | Any | |
| UBBST (when INC_IDX is set) | 1) | No UBBST for 2 cycles |
| | 2) | No UMRC CR_IDX for 2 cycles |
| USALD (when INC_IDX is clear) | 1) | No UMCR CR_ACC for 1 cycle |
| | 2) | No UMRC CR_ACC for 2 cycles |
| USALD (when INC_IDX is set) | 1) | No UMCR CR_ACC for 1 cycle |
| | 2) | No UMRC CR_ACC for 2 cycles |
| | 3) | No UBBST for 2 cycles |
| | 4) No UMRC CR_IDX for 2 cycles | |

Table 1

Functional Description

1.9 Overview of coprocessor

10  The coprocessor is closely coupled to the ARM9X6 processor. Each instruction that is destined for UCP is processed immediately as if the ARM core was executing the instruction itself. UCP is not a fire and forget coprocessor, UCP instructions are executed immediately and the result is available for the following instruction (subject to certain conditions; see section 1.8). This means that there is no need for ARM to poll the status of the coprocessor, and there is no need for the coprocessor to interrupt ARM.

1.10 Functional Diagram

Figure 6:
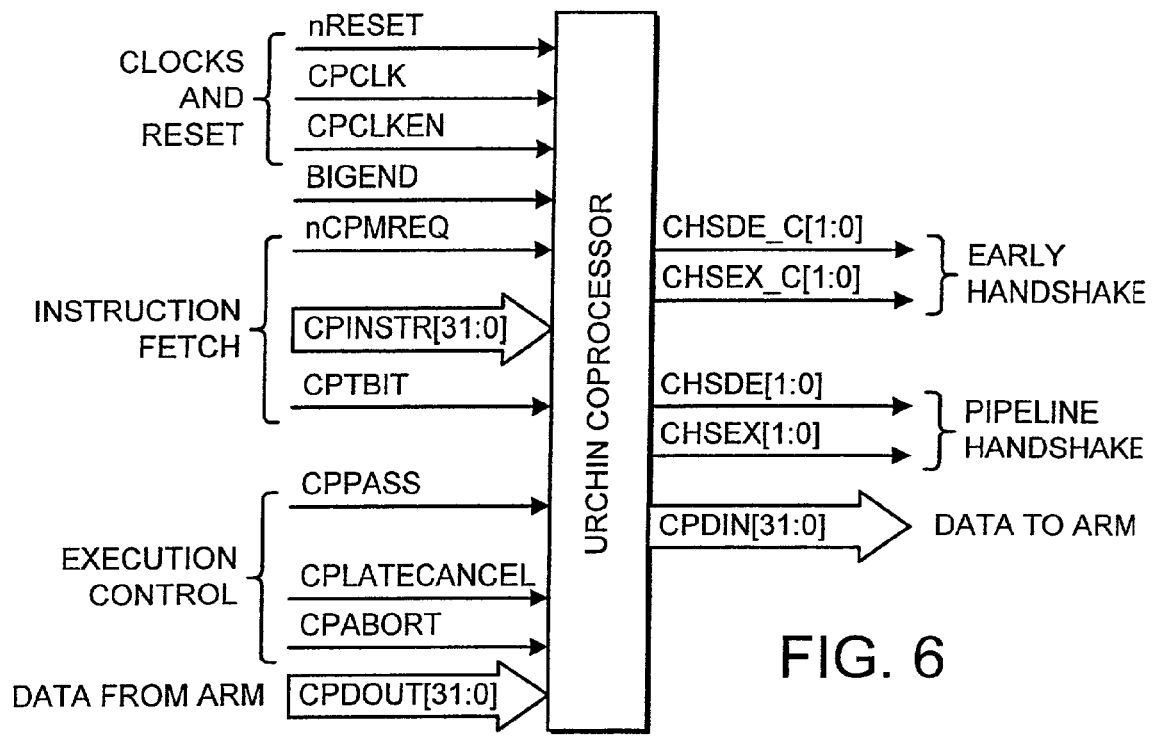

The connectivity of UCP is illustrated in Figure 6.

1.11 Block Diagram

Figure 7:
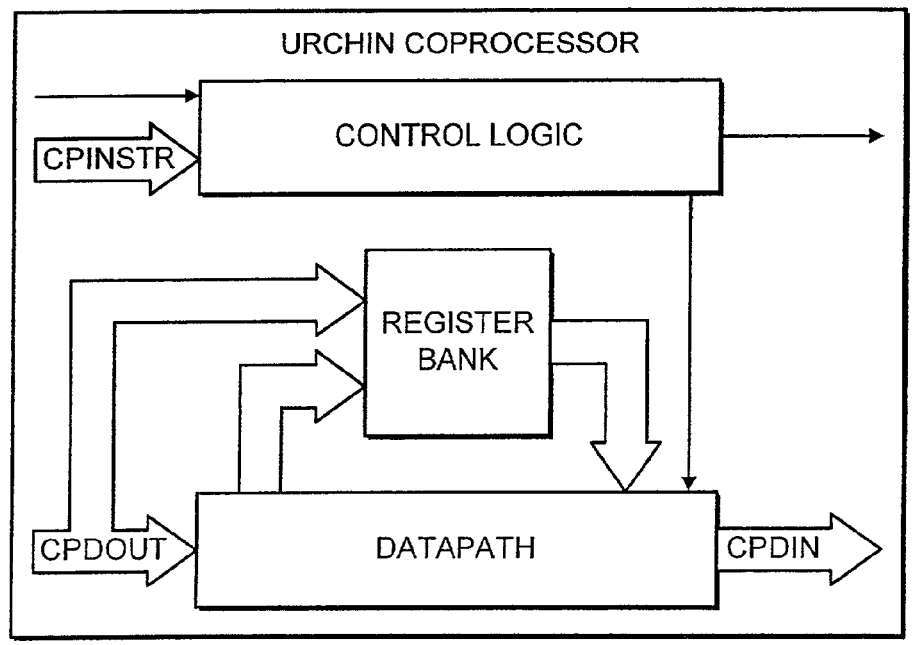

UCP's major blocks are illustrated in Figure 7.

The control logic reads each instruction as it arrives from memory and contains a pipeline follower so that UCP and ARM are in step. The coprocessor pipeline consists of the following stages: fetch, decode, execute, memory, Write and SAD-Accumulate.

The register bank holds the Block Buffer and the MCR/MRC capable registers. The register bank also holds the logic to increment RC_IDX.

The datapath contains the logic for the USALD operation, including byte manipulation, the SAD and the accumulate. The datapath also handles register read selection and result forwarding for internal operations, UMRCs and UBBSTs.

System Connectivity

The UCP is designed to be connected directly to ARM9X6 processors. The CHSDE_C and CHSEX_C outputs are unused in this configuration. For the ARM966 and the ARM946 processors the CPABORT input should be tied low. In this configuration the UCP will need special abort handler code to recover from a data abort during a load operation.

1.12 Connecting to the ARM920T

The ARM920 coprocessor interface is functionally identical to the 9X6 coprocessor interface. However, the interface is significantly different in terms of signal timing. In order for the UCP to be used with an ARM920 a separate external re-timing block is needed. The detail requirements for this re-timing block are beyond the scope of this document, however, the following is a brief overview of the configuration in this case.

The clock provided by the ARM920 is inverted before being passed to CPCLK for the UCP. The CHSDE and CHSEX outputs are unused, instead CHSDE_C and CHSEX_C are passed to a transparent latch which is enabled by the 920 clock.

The CPABORT signal is derived from the ETM interface.

1.13 Connecting additional coprocessors

By default the UCP is not configured for a system using multiple external coprocessors. In order to support this additional logic is required.

If multiple coprocessors are to be attached to the interface, the handshaking signals can be combined by ANDing bit1, and ORing bit 0. In the case of two coprocessors which have handshaking signals CHSDE1, CHSEX1 and CHSDE2, CHSEX2 respectively:

CHSDE[1]<=CHSDE1[1] AND CHSDE2[1]

CHSDE[0]<=CHSED1[0] OR CHSDE2[0]

CHSEX[1]<=CHSEX1[1] AND CHSEX2[1]

CHSEX[0]<=CHSEX1[0] OR CHSEX2[0]

AC TIMING

This section is not currently complete. AC timings are available for 920T in Philips process.

Appendix

1.14 Signal Description

The following table describes the signals for the UCP to interface to the ARM9TDMI. It should be noted that this is subject to change as the implementation commences. The final version may be different from the list shown below.

1.14.1 UCP Instruction fetch interface signals

| Name | Direction | Description |
| --- | --- | --- |
| nCPMREQ | Input | Not coprocessor Memory Request. When LOW on a rising CPCLK edge and CPCLKEN HIGH, the instruction on CPINSTR should enter the coprocessor pipeline follower's decode stage. The second instruction previously in the pipeline followers decode stage should enter its execute stage. |
| CPINSTR[31:0] | Input | Coprocessor Instruction Data. This is the coprocessor instruction data bus over which instructions are transferred to the pipeline follower in the coprocessor. |
| CPTBIT | Input | Coprocessor Thumb Bit. If HIGH, the coprocessor interface is in the Thumb state. |

1.14.2 UCP Data buses

| Name | Direction | Description |
| --- | --- | --- |
| CPDOUT[31:0] | Input | Data Out from ARM. The coprocessor data bus for transferring MCR and LDC data to the coprocessor. |
| CPDIN[31:0] | Output | Data In to the ARM. The coprocessor data bus for transferring MRC and STC data from the coprocessor to the ARM. |

1.14.3 UCP Coprocessor interface signals

| Name | Direction | Description |
| --- | --- | --- |
| CHSDE[1:0] | Output | Coprocessor Handshake Decode. The handshake signals from the decode stage of the coprocessor pipeline follower. |

| | | |
|---|---|---|
| CHSDE_C[1:0] | Output | A combinatorial version of CHSDE, output a cycle in advance of CHSDE (but only valid towards the end of the cycle). Only for use with a 920 re-timing wrapper. |
| CHSEX[1:0] | Output | Coprocessor Handshake Execute. The handshake signals from the execute stage of the coprocessor pipeline follower. |
| CHSEX_C[1:0] | Output | A combinatorial version of CHSEX, output a cycle in advance of CHSEX (but only valid towards the end of the cycle). Only for use with a 920 re-timing wrapper. |
| CPLATECANCEL | Input | Coprocessor Late cancel. When a coprocessor instruction is being executed, if this signal is HIGH during the first memory cycle, the coprocessor instruction should be cancelled without having updated the coprocessor state. |
| CPPASS | Input | Coprocessor Pass. This signal indicates that there is a coprocessor instruction in the execute stage of the pipeline, and it should be executed. |
| CPABORT | Input | Coprocessor operation data abort. This signal is used by the coprocessor to recover from an abort during the data loads. |

1.14.4 UCP Miscellaneous signals

| Name | Direction | Description |
|---|---|---|
| nRESET | Input | Not Reset. |
| | | This is a level-sensitive input signal, which is used to reset the coprocessor. The coprocessor asynchronously reset when nRESET goes LOW. |
| CPCLK | Input | Clock. This clock times all coprocessor memory accesses (both data and instruction) and internal operations. |
| CPCLKEN | Input | Coprocessor Clock Enable. The coprocessor clock CPCLK is qualified by this signal. |
| BIGEND | Input | Static configuration signal. HIGH to support big-endian systems and LOW for little-endian. Usually supplied from the processor (i.e BIGENDOUT from 920). |
| SCANCLK | Input | Clock input for production scan testing. |
| SCANMODE | Input | Test mode control input for production scan testing. |

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Data processing apparatus comprising:
   (i) a main processor responsive to program instructions to perform data processing operations; and
   (ii) a coprocessor coupled to said main processor and responsive to a coprocessor load instruction on said main processor to load one or more loaded data words into said coprocessor and perform at least one coprocessor processing operation specified by said coprocessor load instruction using said one or more loaded data words to provide operand data to generate at least one result data word;
   (iii) wherein in response to said coprocessor load instruction, said coprocessor is configured to load a variable number of loaded data words in dependence upon whether a start address of said operand data within said one or more loaded data words is aligned with a word boundary; and
   (iv) wherein said coprocessor includes an alignment register for storing a value specifying alignment between said operand data and said one or more loaded data words.

2. Data processing apparatus as claimed in claim 1, wherein said coprocessor includes a coprocessor memory for storing one or more locally stored data words used as operands in said at least one coprocessor processing operation in combination with said one or more loaded data words.

3. Data processing apparatus as claimed in claim 1, comprising a memory coupled to said main processor and wherein said main processor is configured to retrieve said one or more loaded data words from said memory to said coprocessor via said main processor without being stored within registers within said main processor.

4. Data processing apparatus as claimed in claim 1, wherein said main processor includes a register operable to store an address value pointing to said one or more data words.

5. Data processing apparatus as claimed in claim 4, wherein said coprocessor load instruction includes an offset value to be added to said address value upon execution.

6. Data processing apparatus as claimed in claim 1, wherein said at least one coprocessor processing operation includes calculating a sum of absolute differences between a plurality of byte values.

7. Data processing apparatus as claimed in claim 6, wherein said coprocessor is arranged to calculate said sum of absolute differences as a sum of absolute differences between a plurality of byte values within said one or more loaded data words and corresponding ones of a plurality of byte values within said one or more locally stored data words.

8. Data processing apparatus as claimed in claim 7, wherein said coprocessor includes an accumulate register for accumulating said sum of absolute differences.

9. Data processing apparatus as claimed in claim 1, wherein said at least one coprocessor processing operation calculates a sum of absolute differences as part of block pixel value matching.

10. A method of processing data comprising the steps of:
    (i) in response to program instructions, performing data processing operations in a main processor; and
    (ii) in response to a coprocessor load instruction on said main processor, loading one or more loaded data words into a coprocessor coupled to said main processor and performing at least one coprocessor processing operation specified by said coprocessor load instruction using said one or more loaded data words to provide operand data to generate at least one result data word;
    (iii) wherein in response to said coprocessor load instruction, a variable number of loaded data words are loaded into said coprocessor in dependence upon a value stored in an alignment register within said coprocessor said value indicating whether a start address of said operand data within said one or more loaded data words is aligned with a word boundary.

11. A computer program product for controlling a computer to perform the steps of:
    (i) in response to program instructions, performing data processing operations in a main processor; and
    (ii) in response to a coprocessor load instruction an said main processor, loading one or more loaded data words into a coprocessor coupled to said main processor and performing at least one coprocessor processing operation specified by said coprocessor load instruction using said one or more loaded data words to provide operand data to generate at least one result data word;
    (iii) wherein in response to said coprocessor load instruction, a variable number of loaded data words are loaded into said coprocessor in dependence upon a value stored in an alignment register within said coprocessor, said value indicating whether a start address of said operand data within said one or more loaded data words is aligned with a word boundary.

\* \* \* \* \*